(12) United States Patent
Boileau et al.

(10) Patent No.: US 11,891,185 B2
(45) Date of Patent: Feb. 6, 2024

(54) NACELLE FOR A PROPULSION ASSEMBLY WITH A VERY HIGH BYPASS RATIO, COMPRISING A REMOVABLE AND STRUCTURAL FRONT INTERNAL STRUCTURE

(71) Applicant: SAFRAN NACELLES, Gonfreville-l'Orcher (FR)

(72) Inventors: Patrick André Boileau, Moissy-Cramayel (FR); Jean-Philippe Joret, Moissy-Cramayel (FR); Vincent Jean-François Peyron, Moissy-Cramayel (FR); Gina Ferrier, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/999,180

(22) PCT Filed: May 18, 2021

(86) PCT No.: PCT/FR2021/050873
§ 371 (c)(1),
(2) Date: Nov. 17, 2022

(87) PCT Pub. No.: WO2021/234279
PCT Pub. Date: Nov. 25, 2021

(65) Prior Publication Data
US 2023/0182913 A1 Jun. 15, 2023

(30) Foreign Application Priority Data
May 20, 2020 (FR) ...................... 2005229

(51) Int. Cl.
*B64D 29/08* (2006.01)
*F02K 1/72* (2006.01)
*B64D 29/06* (2006.01)

(52) U.S. Cl.
CPC ............. *B64D 29/08* (2013.01); *B64D 29/06* (2013.01); *F02K 1/72* (2013.01)

(58) Field of Classification Search
CPC ........... B64D 29/08; B64D 29/06; F02K 1/72
See application file for complete search history.

(56) References Cited

U.S. PATENT DOCUMENTS 2,421,689 A * 6/1947 Elkin ..................... B64D 29/08
244/130
3,541,794 A 11/1970 Johnston et al.
(Continued)

FOREIGN PATENT DOCUMENTS

| EP | 1 553 263 A1 | 7/2005 |
| EP | 1 902 952 A1 | 3/2008 |
| FR | 2039393 A1 | 1/1971 |

OTHER PUBLICATIONS

International Search Report dated Aug. 25, 2021 in PCT/FR2021/050873 filed on May 18, 2021, 2 pages.
(Continued)

*Primary Examiner* — Craig Kim
(74) *Attorney, Agent, or Firm* — Oblon, McClelland, Maier & Neustadt, L.L.P.

(57) ABSTRACT

A nacelle for a propulsion assembly, the nacelle including a front internal structure having a framework formed of longitudinal beams and including removable, dismountable or retractable panels which are provided to facilitate the access for maintenance to the parts of the motor shrouded by these panels.

11 Claims, 11 Drawing Sheets

(56) References Cited

U.S. PATENT DOCUMENTS

| | | | | | |
|---|---|---|---|---|---|
| 4,920,744 | A * | 5/1990 | Garcia | | B64D 29/08 244/54 |
| 6,048,171 | A * | 4/2000 | Donnelly | | F02C 9/18 60/226.3 |
| 7,090,165 | B2 * | 8/2006 | Jones | | F02C 7/00 244/54 |
| 8,127,530 | B2 * | 3/2012 | Lair | | F02K 1/60 239/265.33 |
| 8,136,362 | B2 * | 3/2012 | Beutin | | F01D 25/24 244/54 |
| 8,438,859 | B2 * | 5/2013 | Vetters | | F01D 25/24 60/226.1 |
| 8,448,896 | B2 * | 5/2013 | Caruel | | B64D 29/08 244/54 |
| 8,627,644 | B2 * | 1/2014 | Vauchel | | F02K 1/72 60/226.3 |
| 9,004,855 | B2 * | 4/2015 | Vauchel | | B64D 29/06 415/126 |
| 9,194,296 | B2 * | 11/2015 | Vrljes | | F02C 7/20 |
| 9,200,537 | B2 * | 12/2015 | Bouchard | | F01D 25/162 |
| 9,797,271 | B2 * | 10/2017 | Brown | | F01D 25/26 |
| 2005/0247043 | A1 * | 11/2005 | Derenes | | F01D 9/065 60/226.1 |
| 2006/0038066 | A1 * | 2/2006 | Udall | | F02C 7/20 244/54 |
| 2006/0101804 | A1 * | 5/2006 | Stretton | | F02K 3/04 60/226.1 |
| 2008/0072572 | A1 * | 3/2008 | Beutin | | F01D 25/24 415/189 |
| 2009/0173823 | A1 * | 7/2009 | Shetzer | | B64D 29/06 244/129.4 |
| 2015/0308291 | A1 * | 10/2015 | Brown | | F01D 25/26 415/182.1 |

OTHER PUBLICATIONS

Preliminary French Search Report dated Jan. 15, 2021 in French Patent Application No. 20 05229 filed May 20, 2020, 2 pages (with Translation of Category of Cited Documents).

* cited by examiner

NACELLE FOR A PROPULSION ASSEMBLY WITH A VERY HIGH BYPASS RATIO, COMPRISING A REMOVABLE AND STRUCTURAL FRONT INTERNAL STRUCTURE

Technical Field

The invention relates to the field of nacelles for an aircraft bypass propulsion assembly and relates more specifically to an internal streamlining structure of such a nacelle.

The invention has a particular interest for the architectures of a propulsion assembly with an ultra-high bypass ratio, i.e. having a ratio between the flow rate of the secondary flow and the flow rate of the primary flow that may be as much as or exceed 15.

Prior Art

With reference to FIG. 1, a conventional bypass propulsion assembly comprises a gas generator 1 extending around a longitudinal central axis µl. Relatively to a direction D1 of air flow and gas within the propulsion assembly, the latter comprises at the front a hub 2 secured to the gas generator 1, an external fan casing 3 concentric with the hub 2 and radial arms 4 connecting the hub 2 and the external casing 3 to each other. The hub 2 and the external casing 3 define radially between them a first part 5A of an annular channel 5, referred to as the "secondary duct", intended to convey a flow of cold air, referred to as the "secondary flow", to the rear of the propulsion assembly.

The gas generator 1 is streamlined by a front internal structure 6, which typically includes panels screwed onto an internal casing 7 and/or onto the hub 2, and by a rear internal structure 8 known by the term "fixed internal structure". In a flight position, the front internal structure 6 and the rear internal structure 8 delimit radially inwards a respective longitudinal portion of a second part 5B of the annular channel 5.

The rear internal structure 8 is typically produced in the form of two half-parts able to be opened in a "butterfly", i.e. to be moved each around a respective pivot axis substantially parallel to the longitudinal central axis A1, in order to enable a maintenance operator to access the part of the gas generator 1 thus uncovered.

By convention, the propulsion assembly in FIG. 1 comprises firstly a turbine engine, or engine, that includes the gas generator 1, the hub 2, the external casing 3, the radial arms 4 and the front internal structure 6 and secondly a nacelle comprising the rear internal structure 8.

The panels of the front internal structure 6 are generally dismantled only when the engine is removed, i.e. when the engine is disconnected from the nacelle.

To increase the bypass ratio of such a propulsion assembly and to be able to achieve or exceed a bypass ratio close to 15, architectures such as those illustrated in FIG. 2 are currently developed. In comparison with FIG. 1, the external casing 3 is extended towards the rear, the rear internal structure 8 is shortened to enable it to be opened in a butterfly without its front end abutting against the external casing 3, and the front internal structure 6 is proportionally extended towards the rear.

In such an architecture with an ultra-high bypass ratio, the dimensions of the front internal structure 6 require the latter to be supported by sufficiently robust abutment elements. Particularly as high loads are liable to pass via this front internal structure 6, especially when the nacelle comprises a thrust reverser having obturation flaps that deploy in the annular channel 5 under the action of linkages connected to the front internal structure 6, or connected to elements secured to this front internal structure 6.

Such abutment elements, which are generally formed by parts permanently secured to the engine, are liable to interfere with access to the engine when the front internal structure 6 is removed.

Furthermore, the consequence of such dimensions of such a front internal structure 6 is that removal thereof may prove necessary during ordinary maintenance operations, without removing the engine, numerous items of equipment of the engine may moreover be placed at the rear of the internal casing 7, under the front internal structure 6.

Because of the typical geometry of the abutment elements and the dimensions of such a front internal structure 6, the latter is generally secured to the abutment elements with a large number of screws.

The result is a length of time taken for dismantling the front internal structure 6 that is not acceptable having regard to the time generally available for performing certain routine maintenance operations.

Disclosure of the Invention

One aim of the invention is to procure a nacelle facilitating access to the engine and to its equipment with a view to maintenance thereof, in particular but not exclusively for a propulsion assembly wherein the external fan casing is extended in cantilever towards the rear as illustrated in FIG. 2.

Another aim of the invention is to procure a nacelle having a front internal structure fulfilling a structural function, for example in order to withstand loads resulting from the actuation of a thrust reverser.

The invention relates more generally to procuring a nacelle making it possible to remedy the drawbacks related to the new architectures of a propulsion assembly with an ultra-high bypass ratio and wherein the nacelle incorporates or not a thrust reverser having a completely conventional architecture, for example with fixed or movable grilles and/or with a sliding single-piece external cowling (O-shaped architecture), with external cowling in two half-parts opening in a butterfly integrally with two respective half-parts of the fixed internal structure (D-shaped architecture), or with external cowling in two half-parts opening in a butterfly independently of the fixed internal structure (C-shaped architecture).

For this purpose, the object of the invention is a nacelle for an aircraft bypass propulsion assembly, this nacelle comprising an external structure and a rear internal structure extending around a longitudinal central axis, the rear internal structure being able to move between:

- a flight position wherein it delimits radially inwards a first longitudinal portion of an annular channel intended to channel the secondary flow in the propulsion assembly and wherein it covers a first longitudinal portion of an internal space intended to receive an engine of the propulsion assembly, and
- a maintenance position wherein the rear internal structure is configured for uncovering at least a part of said first longitudinal portion of the internal space in order to enable an operator to access this internal space.

According to the invention, the nacelle comprises a front internal structure comprising beams and one or more panels, the beams extending longitudinally and being spaced apart from each other circumferentially with respect to the longitudinal central axis, the panel or panels being able to be placed in:
- a closed configuration wherein they cooperate with the beams so as to delimit radially inwards a second longitudinal portion of the annular channel and so as to cover a respective circumferential portion of a second longitudinal portion of said internal space,
- a maintenance configuration wherein they leave clear a circumferential space between the beams in order to enable an operator to access said second longitudinal portion of the internal space.

The beams extend longitudinally, these making it possible to support the panel or panels in closed configuration strongly whilst facilitating access to the engine when the panel or panels are placed in a maintenance configuration, by virtue of the circumferential space between the beams.

In addition, such an arrangement of the beams makes it possible to hold the panel or panels in a closed configuration by means of a reduced number of securing members, which makes it possible to shorten the time required for placing the panel or panels in the maintenance configuration.

The front internal structure of this nacelle thus facilitates access to the engine while providing a structural function compatible in particular with incorporating a thrust reverser with conventional grilles.

In one embodiment, the front internal structure comprises a rear end configured for cooperating with a front end of the rear internal structure when the front internal structure is in a closed configuration and the rear internal structure is in a flight position.

Preferably, said rear end of the front internal structure may be formed by one or more of said beams.

In one embodiment, the rear end of the front internal structure cooperates with the front end of the rear internal structure so as to transmit axial forces from the rear internal structure to the front internal structure.

In one embodiment, the beams of the front internal structure are configured for being connected to a frame of the engine, preferably by a front end of these beams.

By way of example, the frame to which the beams are connected in this embodiment may be a rear hub of a fan module of the engine.

In the context of this embodiment, the nacelle may comprise support linkages, each of which is connected at a first end to an intermediate part or a rear part of a respective one of the beams and each of which is configured for being connected at a second end to said frame of the engine.

Such support linkages make it possible in particular to produce thinner lighter beams and to best distribute the loads to which they are subjected.

According to a first variant embodiment, at least one of said panels is connected to one or more of said beams in a pivot connection allowing movement thereof between the closed configuration and the maintenance configuration.

According to a second variant embodiment, at least one of said panels is configured for being connected to a frame of the engine in a pivot connection allowing movement thereof between the closed configuration and the maintenance configuration.

These variants may be combined. For example, one or more panels may be connected to one or more of said beams according to the first variant and one or more other panels may be connected to a frame of the engine according to the second variant.

In one embodiment, at least one of said panels is connected to the rear internal structure in a pivot connection, the rear internal structure comprising a front part provided with a cutout so that, when the rear internal structure is in a flight position and the panels are in a closed position, said front part of the rear internal structure forms a first circumferential sector and said at least one panel connected to the rear internal structure forms a second circumferential sector, the first and the second circumferential sector each delimiting radially inwards a respective sector of said second longitudinal portion of the annular channel.

This makes it possible to limit the number of beams of the front internal structure and to lighten the nacelle.

In one embodiment, the nacelle comprises a thrust reverser having flaps, the external structure being able to move between an advanced position and a retracted position, the nacelle comprising linkages connected at a first end to a respective one of the beams of the front internal structure and at a second end to a respective one of the flaps so that, when the external structure is moved from the advanced position to the retracted position, the flaps deploy in the annular channel.

Another object of the invention is an aircraft bypass propulsion assembly comprising an engine and a nacelle as defined above.

In one embodiment, the engine comprises a hub, an external casing and one or more radial arms connecting the hub and the external casing to each other, the external casing extending longitudinally at the rear with respect to a front part of the front internal structure so that said annular channel is, over a part of said second longitudinal portion, delimited radially inwards by the panel or panels of the front internal structure and radially outwards by the external casing.

Another object of the invention is an aircraft comprising such a propulsion assembly.

Other advantages and features of the invention will emerge from the reading of the following detailed non-limitative description.

BRIEF DESCRIPTION OF THE DRAWINGS

The following detailed description refers to the accompanying drawings, on which.

DETAILED DESCRIPTION OF EMBODIMENTS

Figure 1:
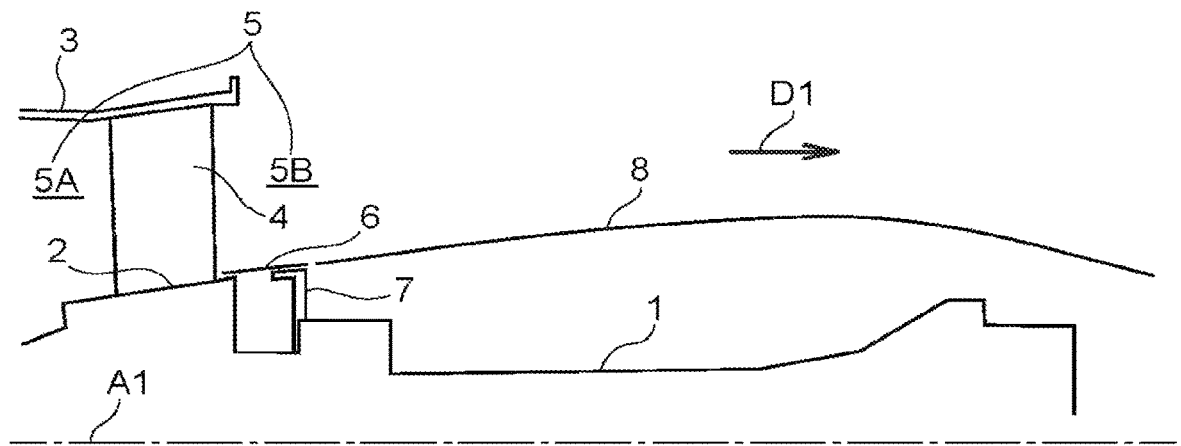
FIG. 1 is a partial schematic half-view of an aircraft propulsion assembly of the prior art, this propulsion assembly typically making it possible to procure a bypass ratio of between 9 and 11.
Figure 2:
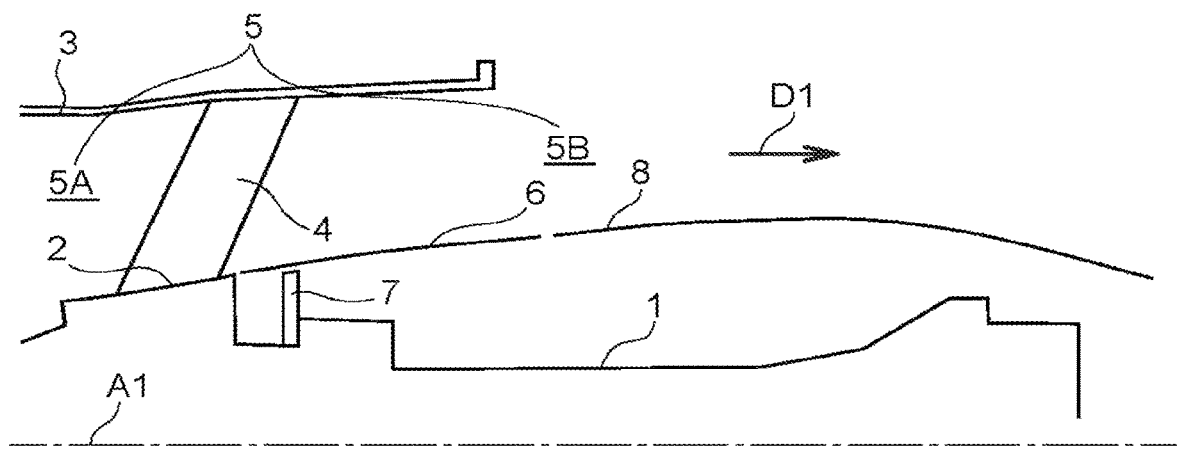
FIG. 2 is a partial schematic half-view of an aircraft propulsion assembly of the prior art, this propulsion assembly typically making it possible to procure a bypass ratio close to 15.
Figure 3:
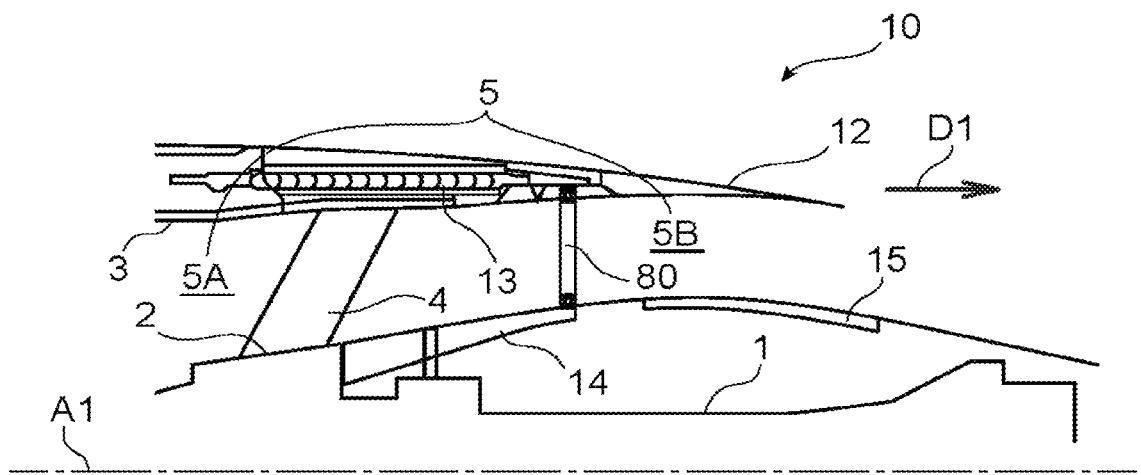
FIG. 3 is a partial schematic half-view of an aircraft propulsion assembly in accordance with the invention, this propulsion assembly comprising a nacelle equipped with a C-shaped thrust reverser.
Figure 4:
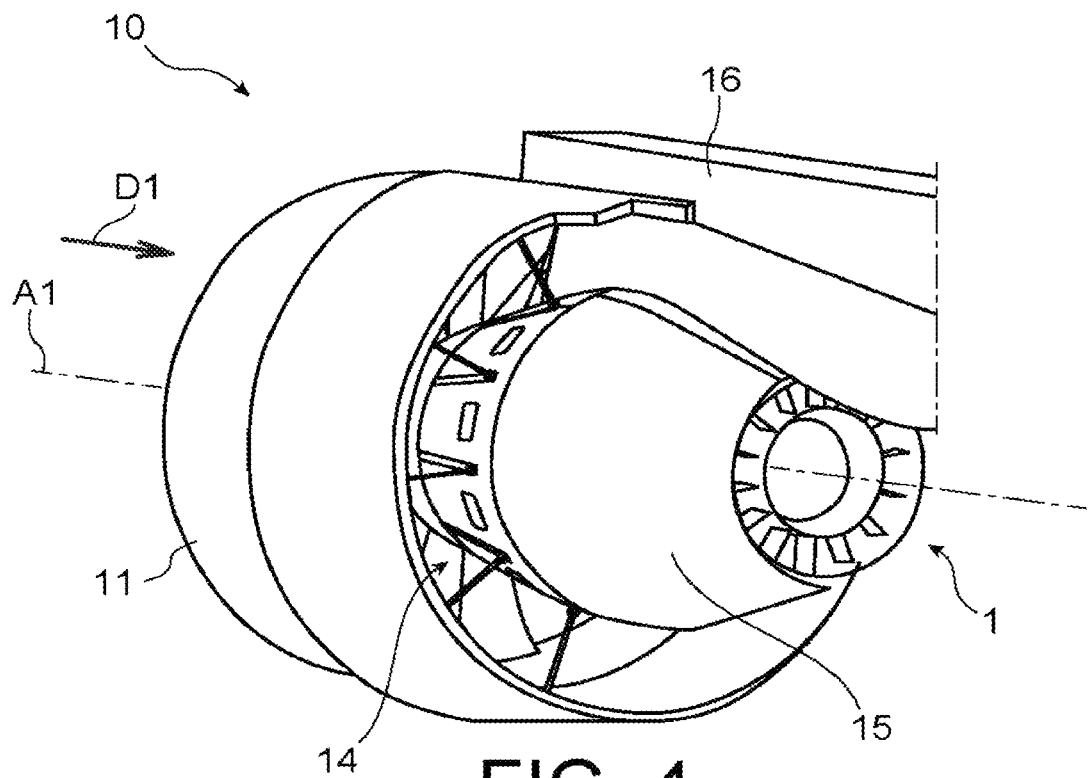
FIG. 4 is a partial schematic view in perspective of an aircraft propulsion assembly according to the invention, similar to the one in FIG. 3, the nacelle comprising a front internal structure and a rear internal structure, this figure showing the front internal structure in a closed configuration and a half-part of the rear internal structure in a flight position.

FIGS. 3 and 4 show two similar examples of a bypass propulsion assembly 10 according to the invention.

The propulsion assembly 10 comprises firstly a nacelle and secondly a turbine engine, also referred to as an "engine" in the present description.

In this example, the engine is a twin-spool bypass turbojet engine.

Hereinafter, the terms "upstream", "downstream", "front" and "rear" are defined with respect to a direction D1 of flow of air and of gas through the propulsion assembly 10 when the latter is propelled.

The engine has a longitudinal central axis A1 around which its various components extend, in particular at the front a fan (not shown) and at the rear a gas generator 1. In a manner known per se, the gas generator 1 comprises, from front to rear, a low-pressure compressor, a high-pressure compressor, a combustion chamber, a high-pressure turbine and a low-pressure turbine.

When the engine is operating, a flow of air enters the propulsion assembly 10 through the air inlet 11 located at the front of the propulsion assembly 10, passes through the fan (not visible) and then divides into a central primary flow and a secondary flow. The primary flow flows in a main duct for circulation of the gases passing through the gas generator 1. The secondary flow for its part flows in an annular channel 5, referred to as the secondary duct, which surrounds the gas generator 1.

With reference to FIG. 3, the engine comprises a hub 2 secured to the gas generator 1 and an external casing 3 concentric with the hub 2. The external casing 3 comprises a front part, not shown, surrounding the fan and a rear part connected to the hub 2 by radial arms 4. The hub 2 and the external casing 3 define radially between them a first part 5A of the secondary duct 5.

In this example, the external casing 3 is extended in cantilever towards the rear with respect to the hub 2, the external casing 3 extending longitudinally rearwards with respect to a rear end of the hub 2. To improve the structural strength of the external casing 3 with respect to the hub 2, the radial arms 4 have a longitudinal inclination.

Still with reference to FIG. 3, the nacelle comprises an external structure 12 containing a thrust reverser 13 of the movable-grille type.

This nacelle also comprises an internal structure delimiting radially inwards a second part 5B of the secondary duct 5, this being delimited radially outwards firstly by a rear portion of the external collar 3 and secondly by the external structure 12 of the nacelle.

The internal structure comprises a front internal structure 14 and a rear internal structure 15.

The rear internal structure 15 is in this example produced in two half-parts symmetrical with respect to a longitudinal mid-plane passing through the longitudinal central axis A1 and passing through a mast 16 of the propulsion assembly 10. More precisely, each half-part of the rear internal structure 15 comprises a circumferential end connected at the mast 16 in a pivot connection making it possible to move these half-parts about a respective pivot axis substantially parallel to the longitudinal central axis A1.

Figure 5:
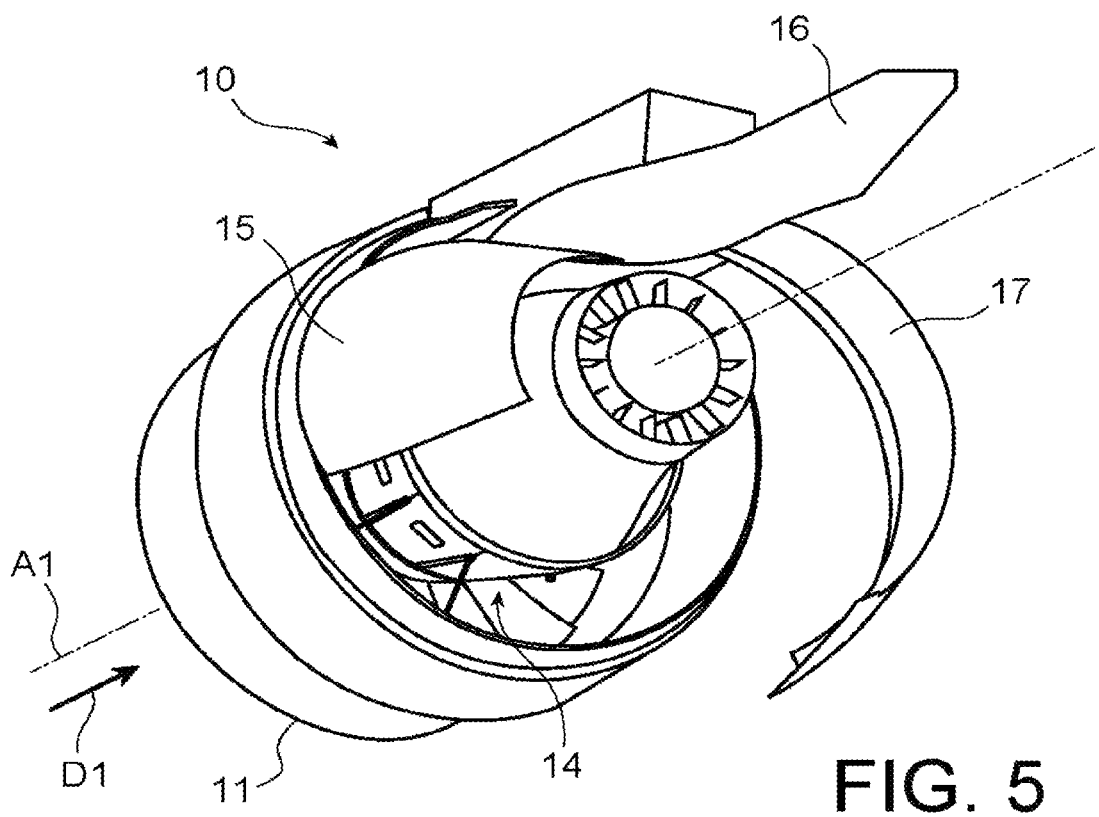
FIG. 5 is a partial schematic view in perspective of the propulsion assembly of FIG. 4, this figure showing said half-part of the rear internal structure in a maintenance position as well as a half-part of an external structure of the nacelle in a maintenance position.

A single half-part of the rear internal structure 15 is shown on FIGS. 4 and 5, this being shown in FIG. 3 in a closed position, or flight position, and in FIG. 4 in an open position, or maintenance position.

The rear internal structure 15 therefore opens conventionally in a butterfly.

When each of the half-parts of the rear internal structure 15 is in a flight position (FIG. 3), this rear internal structure 15 delimits radially inwards a first longitudinal portion, or rear longitudinal portion, of said second part 5B of the secondary duct 5. The rear internal structure 15 in flight position delimits radially outwards a first longitudinal portion, or rear longitudinal portion, of an internal space in which the gas generator 1 extends.

In maintenance position (FIG. 4), the rear internal structure 15 uncovers at least one circumferential part of said rear longitudinal portion of the internal space, which enables a maintenance operator to access this internal space in order to repair the engine.

In the example of FIG. 5, the external structure 12 of the nacelle comprises two half-panels 17, only one half-panel 17 being shown in this figure. The half-panels 17 form an external cowling that is movable, independently of the rear internal structure 15, between a closed position (the position shown in FIG. 3) and an open position (not shown). The nacelle therefore has in this example a C-shaped architecture well known in this field.

Figure 6:
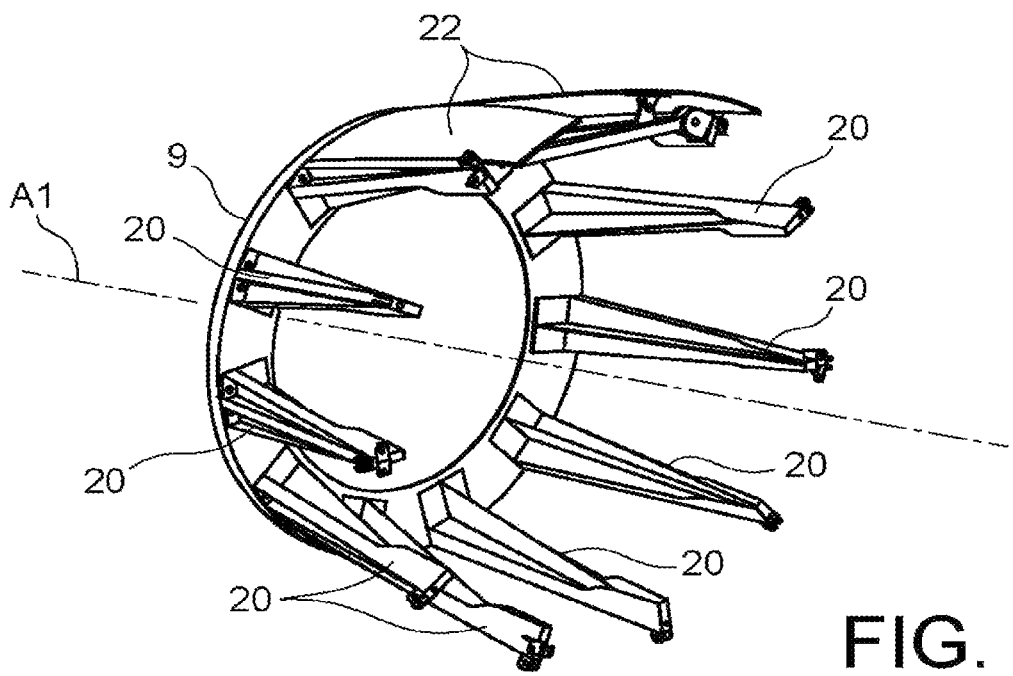
FIG. 6 is a schematic view in perspective of a framework of the front internal structure of FIG. 4 according to a first embodiment, this framework comprising a first type of longitudinal beam secured to a frame.
Figure 7:
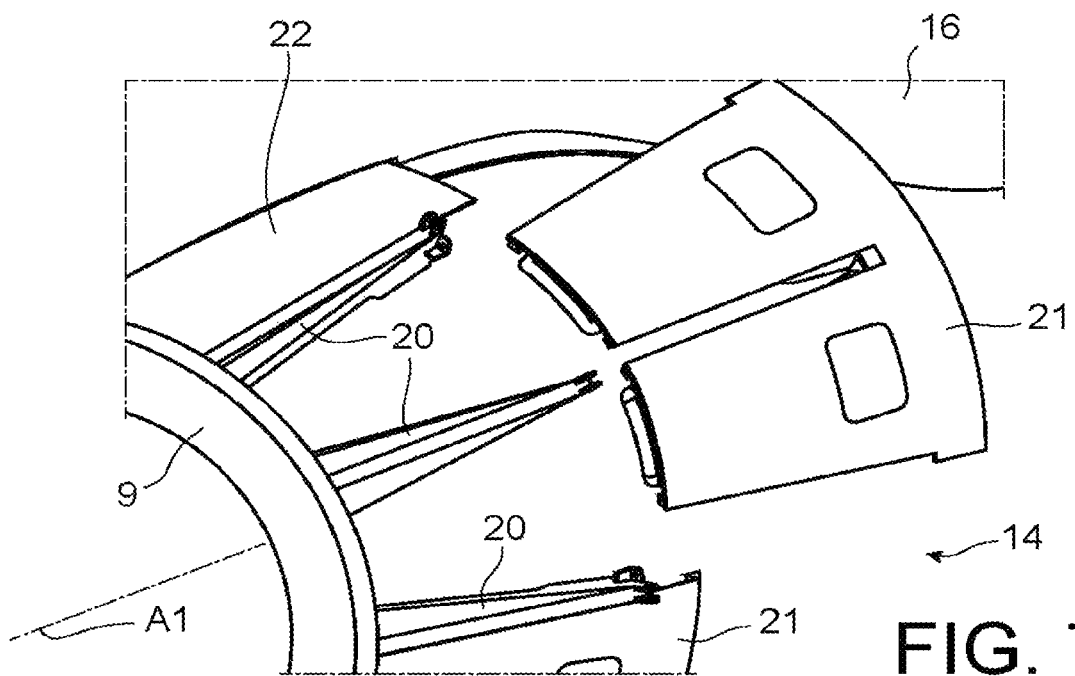
FIG. 7 is a partial schematic view in perspective of the front internal structure of FIG. 4, this figure showing a panel of this front internal structure disconnected from the beams of this front internal structure.

With reference to FIGS. 6 and 7, the front internal structure 14 comprises beams 20 and panels 21 and 22.

In this embodiment, the beams 20 are each connected by their front end to a part of a frame 9 of the engine, which in this example corresponds to a rear part of the hub 2, so as to be regularly spaced apart from each other, circumferentially around the longitudinal central axis A1.

The beams 20 thus fixed each extend longitudinally, i.e. in a direction substantially parallel to the longitudinal central axis A1.

The beams 20 thus form a framework secured to the engine, designed to support the panels 21 and 22 as described below.

Figure 8:
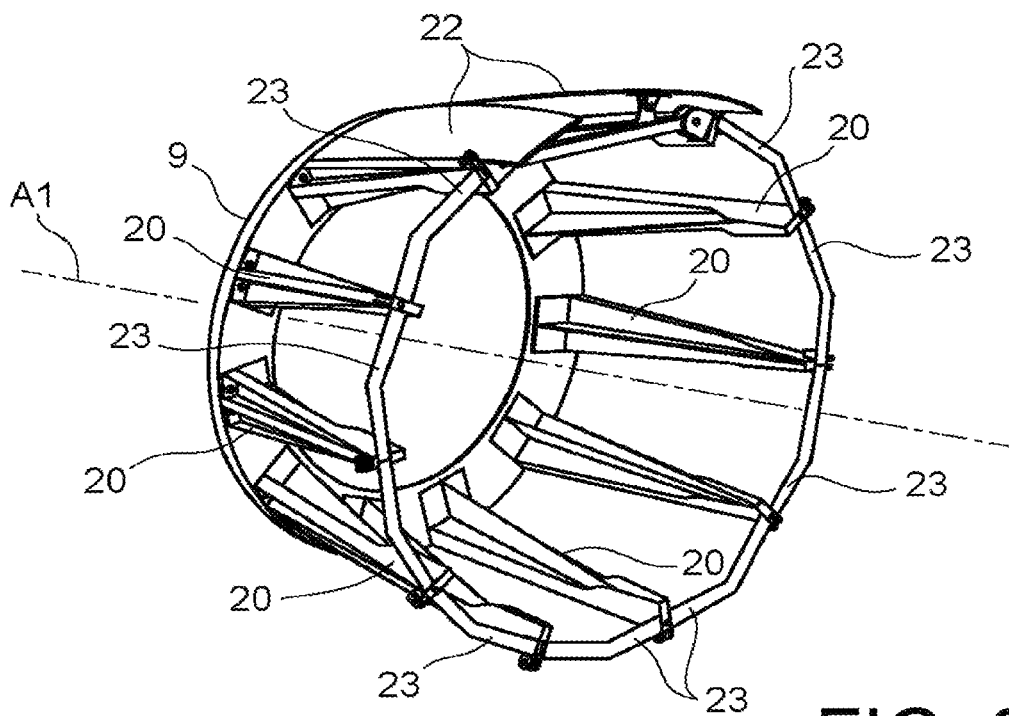
FIG. 8 is a schematic view in perspective of a framework of the front internal structure according to a second embodiment, this framework comprising longitudinal beams secured to a frame and linkages for absorbing circumferential forces.

FIG. 8 shows a framework that is distinguished from the one in FIG. 6 in that it comprises linkages or brackets 23 each connecting two adjacent beams 20 by their rear end. These brackets 23 in this example form an annular member for absorbing circumferential forces.

In one embodiment, the brackets 23 are connected to the beams 20 by demountable securing means (not shown) enabling them to be dismantled quickly in the event of a maintenance operation.

In the example of FIGS. 6 to 8, the beams 20 are cantilevered in that they are connected to the frame 9 of the engine only by their front end.

Figure 9:
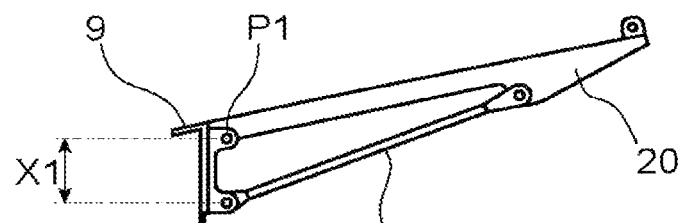
FIG. 9 is a schematic view of a beam according to a second type for a front internal structure according to the invention.
Figure 10:
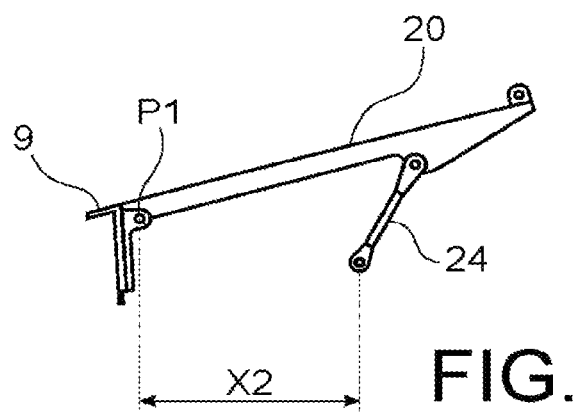
FIG. 10 is a schematic view of a beam according to a third type for a front internal structure according to the invention.

In another embodiment, one or more of the beams 20 forming the framework of the front internal structure 14 can be stabilised by support linkages 24 in accordance with the principles illustrated on FIGS. 9 and 10.

In the example of FIG. 9, the support linkage 24 of the single beam 20 shown on this figure is connected at one of its ends to a rear part of this beam 20 and is connected at its other end to the frame 9 of the engine, at a non-zero radial distance X1 from the point P1 where the beam 20 is attached to this same frame 9.

In the example of FIG. 10, the support linkage 24 of the single beam 20 shown on this figure is also connected at one of its ends to a rear part of this beam 20. Unlike the example in FIG. 9, the support linkage 24 is sized so as to be connected at its other end to a part of the engine located at a non-zero longitudinal distance X2 from the attachment point P1.

The selection of the use of such a support linkage 24 and of the corresponding radial X1 or longitudinal X2 distances depends in particular on the space available.

With reference to FIGS. 6 and 7, the panels 22 are in this example intended to extend on either side of the mast 16 of the propulsion assembly 10 and are secured for example by means of screws to beams 20 located circumferentially at the mast 16.

The panels 21 are for their part removable, dismountable or retractable in accordance with the principles described below.

This is because the panels 21 are designed to be able to be moved between a so-called closed configuration in which they cooperate with the beams 20, such as the panel 21 shown partially at the bottom of FIG. 7, and a so-called maintenance configuration in which they leave clear a circumferential space between the beams 20, such as the panel 21 shown at the top on FIG. 7.

On the FIGS. 4 and 5, the front internal structure 14 is shown in a configuration in which the panels of this structure, similar to the panels 21 in FIG. 7, are in closed configuration.

In closed configuration, the panels 21 cooperate with the beams 20 so as to delimit radially inwards a second longitudinal portion, or front longitudinal portion, of said second part 5B of the secondary duct 5.

The panels 21 in closed configuration simultaneously cover a respective circumferential portion of a second longitudinal portion, or front longitudinal portion, of said internal space in which the gas generator 1 extends.

Figure 11:
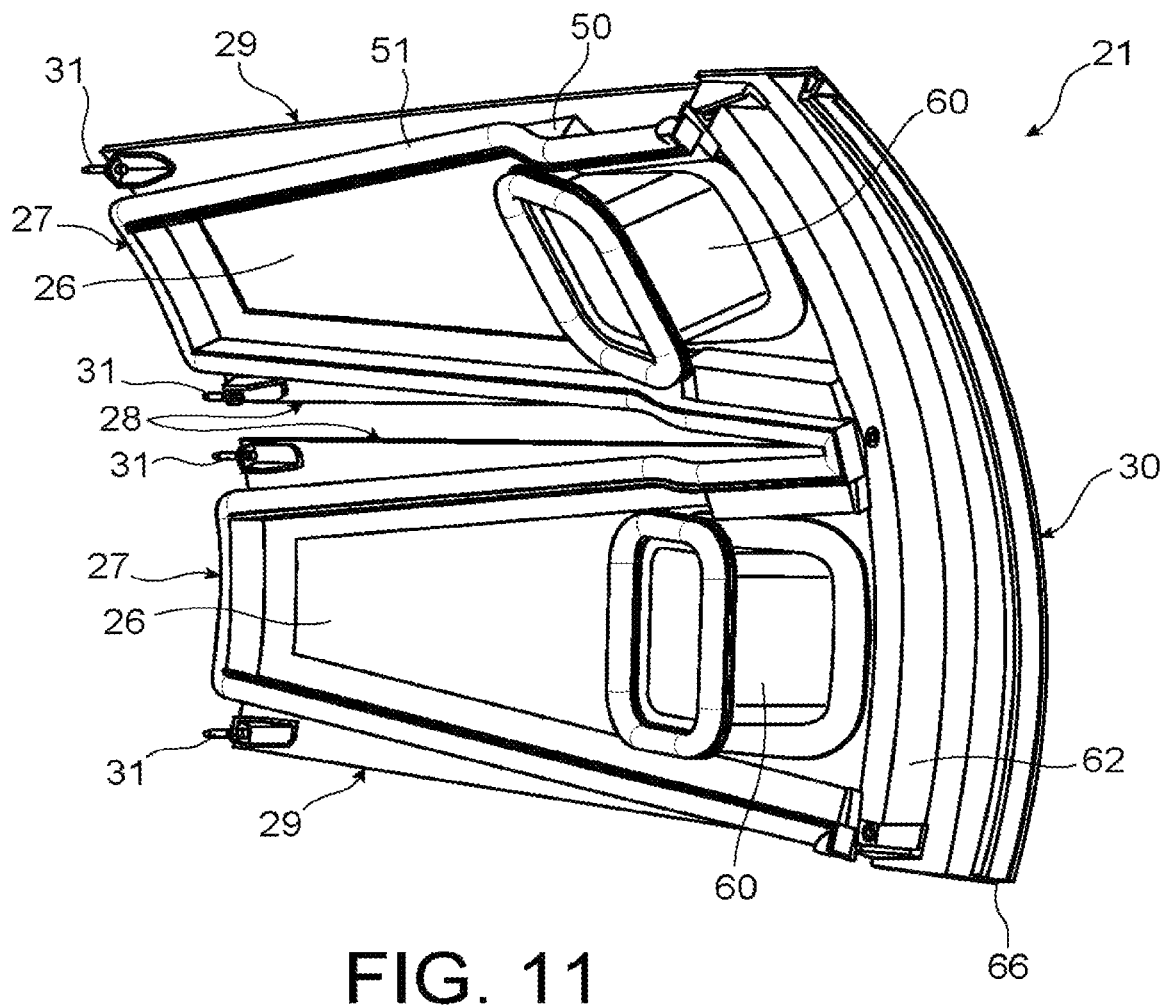
FIG. 11 is a schematic view in perspective of a panel of the front internal structure of FIG. 4.

FIG. 11 shows a panel 21 of the front internal structure 14.

This panel 21 comprises two sectors 26 extending longitudinally and each having a front end 27, an internal lateral end 28 and an external lateral end 29.

The panel 21 comprises a rear end 30 at which the two sectors 26 are connected to each other.

The internal lateral ends 28 of the two sectors 26 are facing each other so as to define a longitudinal opening.

With reference to FIGS. 4, 7 and 11, this arrangement of the panel 21 enables it to be placed on the framework formed by the beams 20 so that said longitudinal opening is located circumferentially at one of the beams 20, referred to as the reference beam, and so that the external lateral end 29 of each of the sectors 26 is facing:
  either an external lateral end 29 of another adjacent panel 21 so as to define therewith a longitudinal opening located circumferentially at another beam 20 adjacent to the reference beam 20,
  or a lateral end of one of the fixed panels 22 so as to define therewith a longitudinal opening located circumferentially at another beam 20 adjacent to the reference beam 20.

The front internal structure 14 can comprise one or more panels 21 of the type illustrated in FIG. 11 and/or one or more panels of another type, comprising for example a single sector 26 or three or more sectors 26.

In the example in FIG. 6, the framework of the front internal structure 14 comprises ten beams 20, two of them being designed to be positioned on either side of the mast 16 of the propulsion assembly 10, the fixed panels 22 extending circumferentially from these beams towards the mast 16. Thus this framework can for example receive three panels having two sectors 26, such as the panel 21 in FIG. 11, and a panel (not shown) having three sectors 26, or four panels having two sectors 26 such as the panel 21 in FIG. 11 and a panel (not shown) having a single sector 26.

The description that follows relates to a single panel 21 such as the one in FIG. 11 and applies by analogy to any other panel having for example a different number of sectors 26.

To hold the panel 21 on the framework of the front internal structure 14, in this example provision is made for using one or more front positioning members of this panel 21.

Figure 12:
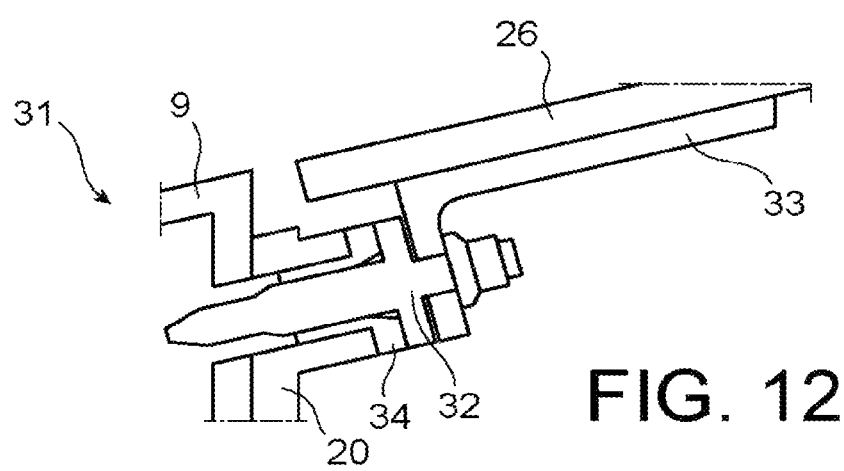
FIG. 12 is a schematic view of a front positioning member of the panel of FIG. 11.

FIG. 12 shows a front positioning member 31 that comprises a male part and a female part. The male part includes a pin 32 secured to a bracket 33. The female part includes a ring 34 defining a housing configured for receiving a part of the pin 32.

In the example of FIG. 11, the male parts of two front positioning members 31 are secured at the front end of each of the sectors 26 of the panel 21.

The corresponding female parts are in the example of FIG. 6 secured to the beams 20. In this example, each beam 20 carries at its front end two rings 34 so that, when the panel 21 is placed in a closed configuration on the framework, each of the pins 32 is received in the housing of a respective ring 34.

In an embodiment that is not shown, the housing of the female part of the member 31 is produced directly in the beam 20 and/or in the frame 9 of the engine.

In this example, the front internal structure 14 also comprises rear positioning members of the panel 21.

Figure 13:
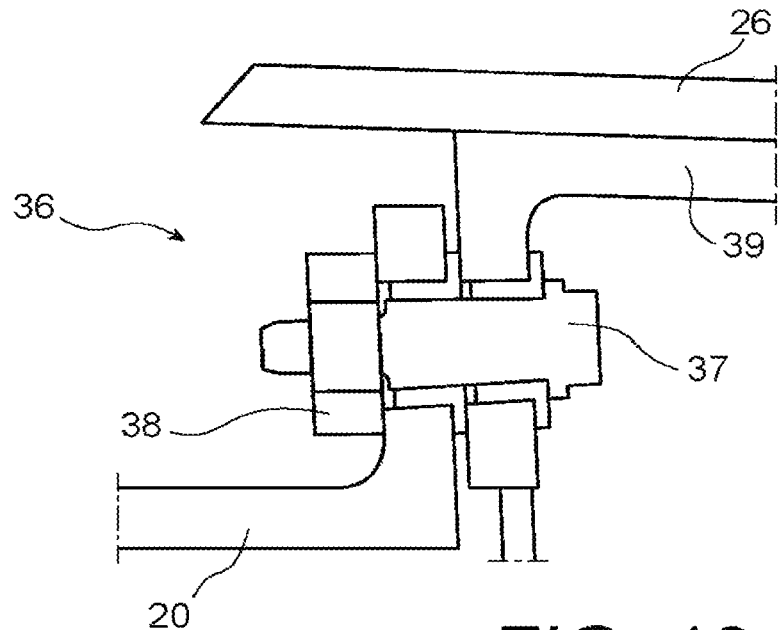
FIG. 13 is a schematic view of a rear positioning member according to a first type for the panel of FIG. 11.

FIG. 13 shows a rear positioning member 36 comprising a screw 37 and a nut 38 designed to hold the panel 21 and a beam 20 against each other in a substantially longitudinal direction.

To do this, the rear positioning member 36 comprises a bracket 39 secured close to the rear end 30 of the panel 21 and comprises an orifice able to have the screw 37 pass through it. In this example, each beam 20 of the front internal structure 14 comprises at its rear end at least one orifice able to have the screw 37 pass through it. The front internal structure 14 is configured so that, when the panel 21 is in closed configuration, the screw 37 can be inserted through the orifice produced in the bracket 39 and the orifice produced in a corresponding beam 20, and then assembled with the nut 38 as illustrated in FIG. 13.

In the example of FIG. 11, the panel 21 preferably comprises at least three rear positioning members 36 of this type, two positioned at the external lateral ends 29 and another one positioned circumferentially at the middle of the panel 21, i.e. at equal distances from its external lateral ends 29.

Figure 14:
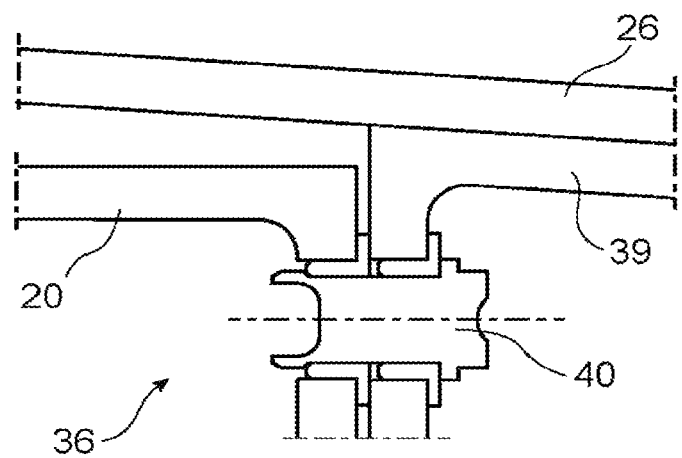
FIG. 14 is a schematic view of a rear positioning member according to a second type for the panel of FIG. 11.

FIG. 14 shows another example of a rear positioning member 36 that is distinguished from the one in FIG. 13 in that the screw 37 and the nut 38 are replaced by a pin 40 axially secured to the bracket 39 and the end of which received in the orifice in the beam 20 is elastically deformable so as to require a predetermined force to engage the pin 40 in this orifice or to withdraw it therefrom.

The front 31 and rear 36 positioning members are in these examples for axial mounting, the pins 32 and 40 and the screw 37 extending in a direction substantially parallel to the longitudinal central axis A1 when the panel 21 is in closed configuration. In another embodiment, not shown, the front 31 and rear 36 positioning members, or a part of them, are for radial mounting.

Such front 31 and rear 36 positioning members improve the holding of the panel 21 in position in closed configuration, thus reducing aerodynamic disturbance.

Such front 31 and rear 36 positioning members also facilitate and accelerate the mounting and removal of the panel 21, i.e. the movement thereof between the closed and maintenance configurations.

Figure 15:
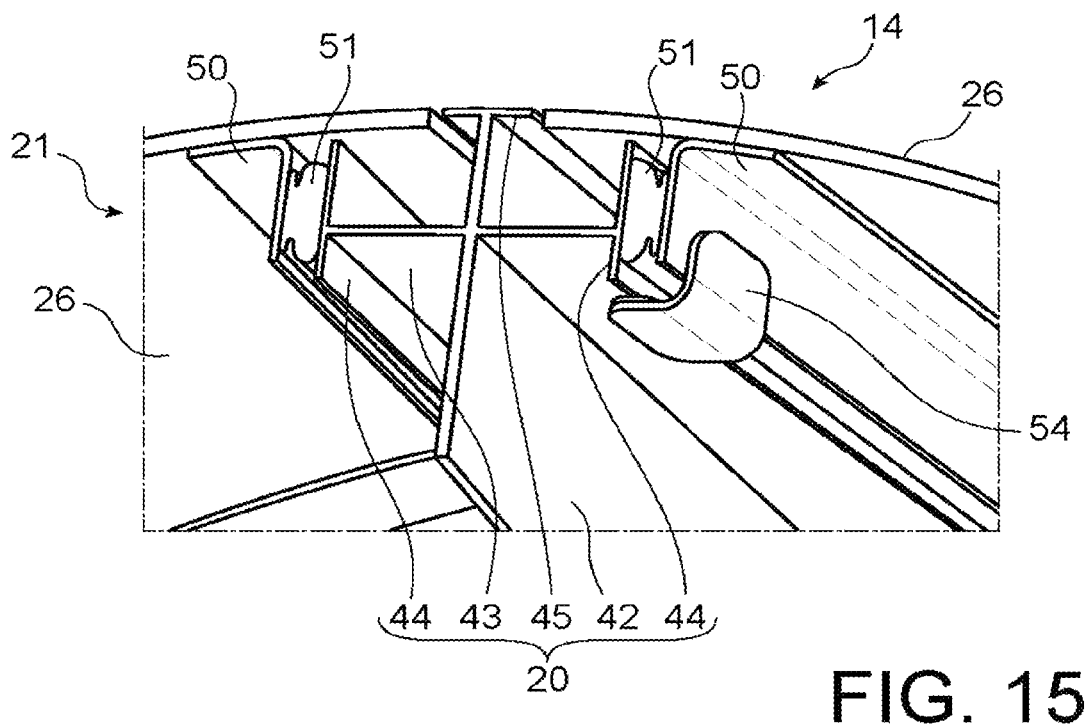
FIG. 15 is a partial schematic view in perspective of a front internal structure according to the invention, this figure showing a stop member according to a first type for holding a panel and a beam of this front internal structure radially in abutment one against the other.

FIG. 15 shows one of the beams 20 of the front internal structure 14 and the panel 21 of FIG. 11 in closed configuration.

This beam 20 has, in a cross section, a radial bar 42 and a circumferential bar 43 forming a cross. Each of the ends of the circumferential bar 43 carries an abutment element 44 defining an abutment face substantially parallel to the radial bar 42. The radially outward end of the radial bar 42 carries a rib 45 fitting flush with the panel 21.

In another embodiment, not shown, the panel 21 covers radially outwards the radial bar 42, which may not have a rib 45, or more generally the beam 20. This makes it possible in particular to reduce the aerodynamic disturbance. Such an embodiment is in particular compatible with a nacelle with no thrust reverser or having a D- or O-shaped architecture.

With reference to FIGS. 11 and 15, each sector 26 of the panel 21 comprises a bracket 50 carrying a seal 51 configured for being in abutment against the abutment face of two beams 20 of the front internal structure 14 when the panel 21 is in closed configuration.

FIG. 15 shows a stop member 54 configured for improving the holding of the panel 21 in closed configuration in relation to this beam 20.

This stop member 54 forms a square bracket, a part of which is connected, for example by welding, to one of the brackets 50 of the panel 21 and another part is configured for coming into radial abutment on one of the abutment elements 44 of the beam 20 when the panel 21 is in closed configuration.

Several stop members 54 of this type can be installed for holding the panel 21.

In the example in FIG. 15, the part of the stop member 54 in radial abutment on one of the abutment elements 44 of the beam 40 forms a stop preventing a movement of the panel 21 with respect to the beam 20 in a first radial movement direction. Each sector 26 of the panel 21 moreover comprises a portion located radially on the other side of this abutment element 44, preventing or at least limiting the movement of the panel 21 with respect to the beam 20 in a second radial movement direction. As a result, in this example, the panel 21 must be mounted on the beam 20 by axial translation, typically from a configuration similar to that illustrated in FIG. 7.

In general, such a stop member 54 tends to limit the deformation of the panel 21 under the action of the aerodynamic stresses to which it is submitted and makes it possible to avoid, where applicable the disengagement of the pin 32 of a positioning member 31 optionally equipping the front internal structure 14.

Figure 16:
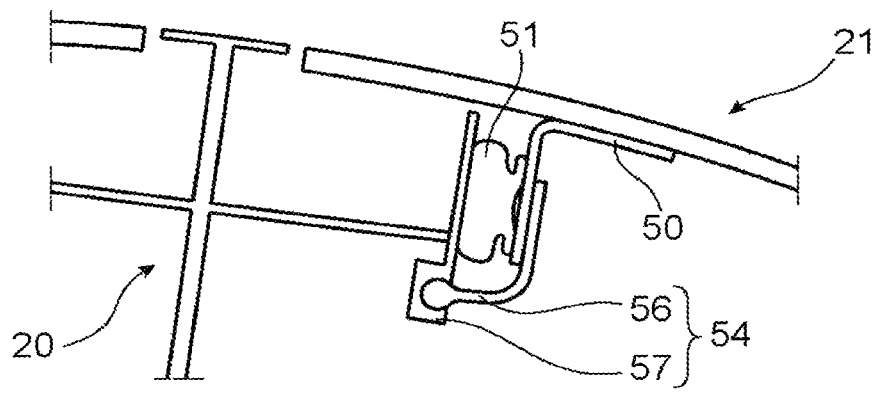
FIG. 16 is a partial schematic view in perspective of a front internal structure according to the invention, this figure showing a stop member according to a second type for holding a panel and a beam of this front internal structure radially in abutment one against the other.

Such effects can be obtained by alternative or complementary means, for example using a stop member 54 as illustrated in FIG. 16.

The stop member 54 in FIG. 16 comprises a rail 56 secured to the panel 21 and a slider 57 secured to the beam 20. Naturally, in another embodiment that is not shown, the rail 56 can be secured to the beam 20 and the slider 57 secured to the panel 21.

Generally, the panel 21 may comprise one or more front positioning members 31 such as the one illustrated in FIG. 12 and/or one or more rear positioning members 36 such as those illustrated in FIGS. 13 and 14 and/or one or more stop members 54 such as those illustrated in FIGS. 15 and 16.

These various members allow rapid mounting and removal of the panel 21 and can be used in a small number while ensuring satisfactory holding of the panel 21 in closed configuration.

In the example of FIG. 11, each sector 26 of the panel 21 is equipped with a ventilation member 60 of the scoop or vent type forming an interface intended to cooperate sealingly with a corresponding interface (not shown) of the engine when the panel 21 is in closed configuration.

The panel 21 in FIG. 11 moreover comprises a square bracket 62 for absorbing circumferential forces extending around the longitudinal central axis A1 when this panel 21 is in closed configuration.

Figure 17:
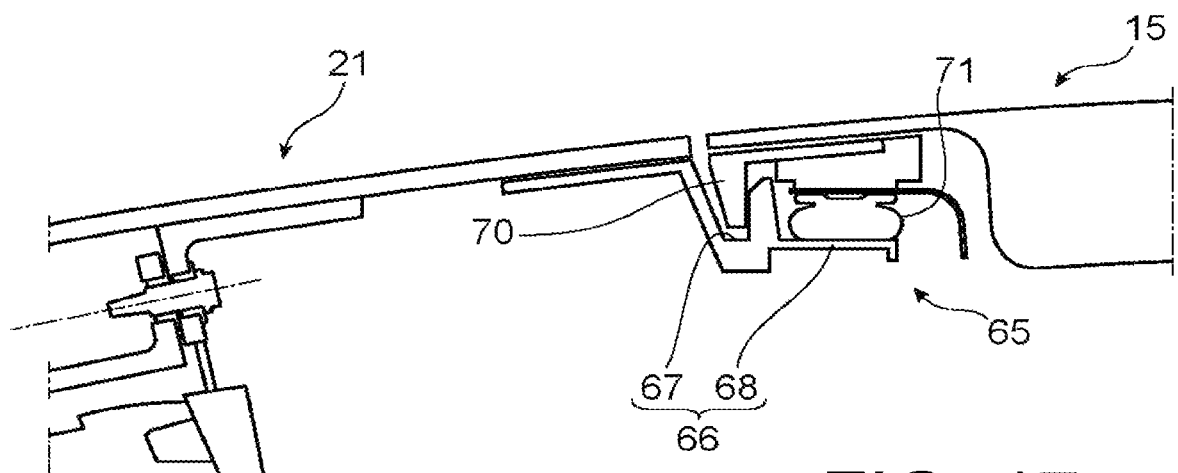
FIG. 17 is a partial schematic view of a nacelle according to the invention, this figure showing a first type of junction mechanism of a front internal structure and of a rear internal structure of this nacelle.

With reference to FIG. 17, the nacelle comprises in this example a junction mechanism 65 configured for connecting the front internal structure 14 and the rear internal structure 15 when these are respectively in closed configuration and in flight position.

In particular, the front internal structure 14 comprises a rear end configured for cooperating with a front end of the rear internal structure 15.

For this purpose, the junction mechanism 65 comprises firstly a piece 66 secured to the rear end of the panel 21 (see FIGS. 11 and 17). When the front internal structure 14 is in closed configuration, this piece 66 forms a groove 67 extending circumferentially and being open radially outwards. The piece 66 also comprises an abutment arm 68.

The junction mechanism 65 moreover comprises a radial arm 70 attached to the front end of the rear internal structure 15. In flight position, the radial arm 70 cooperates with the groove 67 in the piece 66 so that the junction mechanism 65 makes it possible to transmit axial forces from the rear internal structure 15 to the panel 21 or more generally to the front internal structure 14.

The junction mechanism 65 furthermore comprises a seal 71 secured to the rear internal structure 15 and configured for coming into radial abutment against the support arm 68 of the piece 66 when the rear internal structure 15 is in flight position.

With reference to FIG. 11, the piece 66 of the junction mechanism 65 extends in this example from one of the external lateral ends 29 of the panel 21 as far as the other external lateral end 29 of this panel 21.

The dimensions of the junction mechanism 65, in particular the circumferential dimension of the piece 66, and the number of junction mechanisms 65 can be adapted according to the stresses liable to pass through the rear internal structure 15 to the front internal structure 14.

Figure 18:
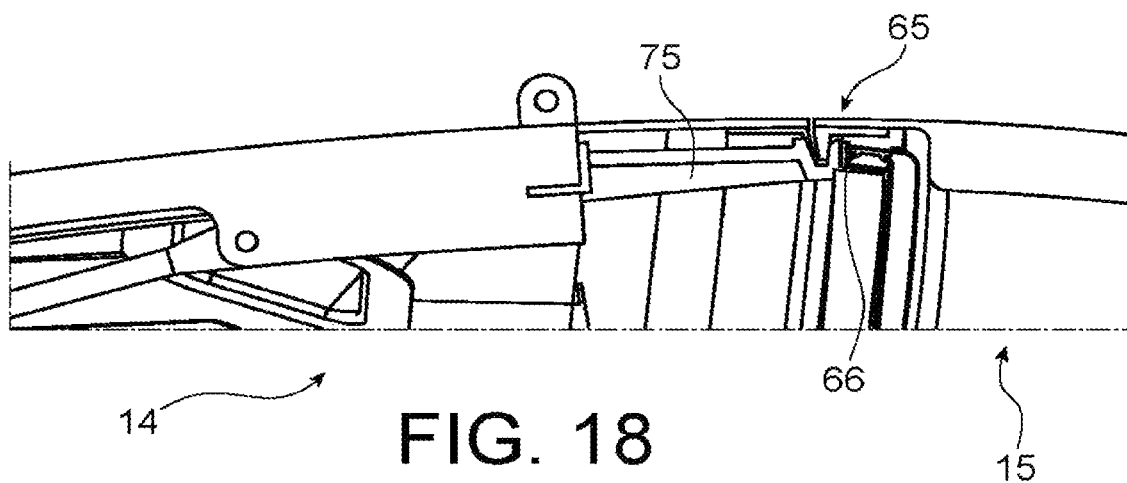
FIG. 18 is a partial schematic view of a nacelle according to the invention, this figure showing a second type of junction mechanism of a front internal structure and of a rear internal structure of this nacelle.

In a variant illustrated in FIG. 18, the beams 20 comprise an extension 75 extending towards the rear and carrying one or more pieces similar to the piece 66 described above to form one or more junction mechanisms 65 connecting one or more of the beams 20 of the front internal structure 14 and the rear internal structure 15 in flight position.

In other words, said rear end of the front internal structure 14 cooperating with the front end of the rear internal structure 15 can be formed by one or more of the beams 20.

This variant makes it possible to make the axial forces pass directly in the beams 20 without passing through the panels 21.

Figure 19:
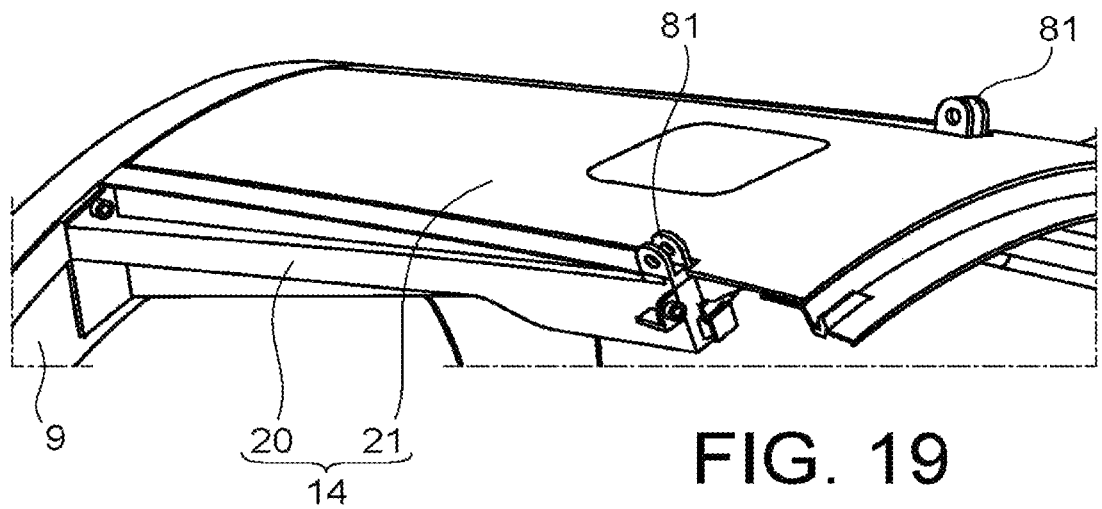
FIG. 19 is a partial schematic view in perspective of a front internal structure according to the invention, the beams of this front structure comprising a clevis for articulating a linkage of a thrust reverser.

With reference to FIGS. 3 and 19, the thrust reverser 13 comprises in this example flaps (not shown). In a manner known per se, these flaps are designed to be deployed or retracted in the secondary duct 5 under the combined action of an axial translation of the external structure 12 and of linkages 80.

In this example, the beams 20 of the front internal structure 14 each comprise a clevis 81 on which an end of a respective one of the linkages 80 of the reverser 13 is articulated, the other end of this linkage 80 being conventionally connected to a respective one of the flaps of this reverser 13.

The embodiment in FIG. 19 is in particular compatible with a nacelle having an O-shaped architecture.

Figure 20:
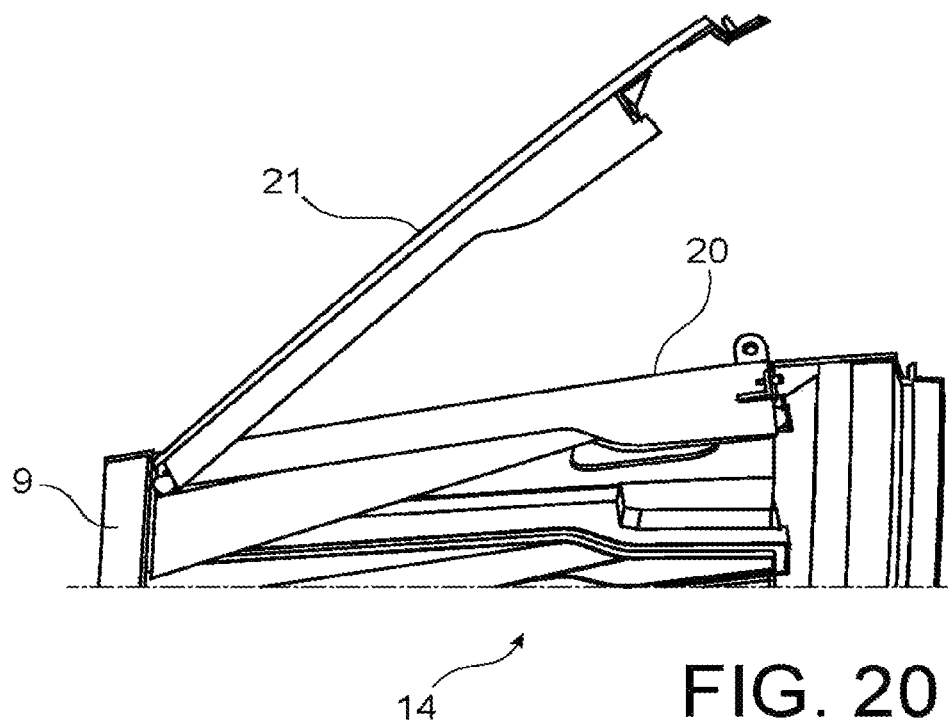
FIG. 20 is a partial schematic view of a front internal structure according to the invention, this front internal structure comprising a panel articulated on a nacelle frame.

FIG. 20 illustrates a variant embodiment wherein the panels 21 of the front internal structure 14 are articulated at their front end on the frame 9 in order to be able to move them between the closed configuration and the maintenance configuration by rocking.

In this case, attachment means (not shown) may be provided, such as bolts configured for being able to quickly lock and unlock the panels 21 on the beams 20, preferably at their rear end.

In the various embodiments above, the front end of the rear internal structure 15 is longitudinally located at the rear with respect to the rear end of the external casing 3 of the engine. Thus, when the rear internal structure 15 is moved from the flight position to the maintenance position, it does not come into collision with the external casing 3 (see FIG. 5).

Figure 21:
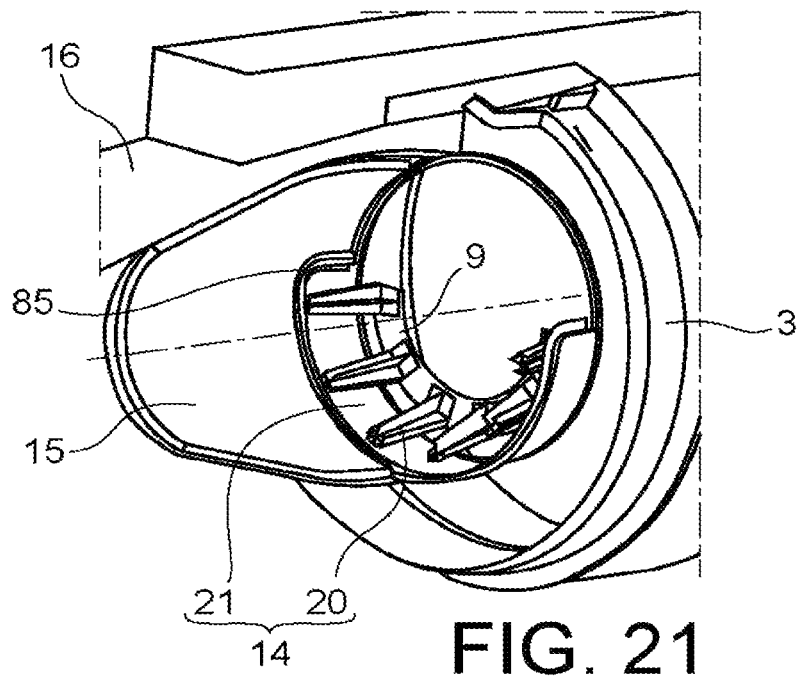
FIG. 21 is a partial schematic view in perspective of a nacelle according to the invention, the front internal structure of this nacelle being housed in an opening produced in its rear internal structure.
Figure 22:
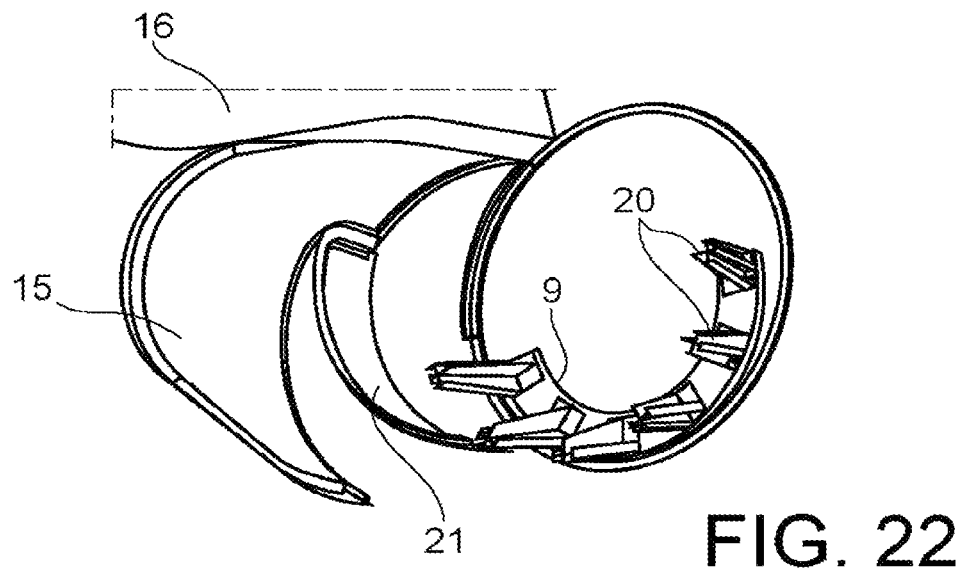
FIG. 22 is a partial schematic view in perspective of a nacelle according to the invention, the front internal structure being articulated on the rear internal structure of this nacelle.

FIGS. 21 and 22 show another type of architecture of the front 14 and rear 15 internal structures also making it possible to avoid such a collision.

In the embodiment in FIG. 21, the rear internal structure 15, only one half-part of which is shown in the closed position, or flight position, comprises a cutout 85 defining, on a front longitudinal portion, a first closed circumferential sector and forming an opening on a second circumferential sector of this front longitudinal portion.

The beams 20 of the front internal structure 14 are placed circumferentially within this second circumferential sector so that, when one or more panels 21 of the front internal structure 14 are supported by the beams 20 in closed configuration, this or these panels 21 close the second circumferential sector and form together, with the part of the rear internal structure 15 extending over the first circumferential sector and the front longitudinal portion, a substantially annular structure.

The geometry of the cutout 85 and the respective circumferential dimension of the first and of the second circumferential sector are selected so that, when the rear internal structure 15 is placed in the maintenance position, the external casing 3 extends partly in the opening defined by the cutout 85. The respective circumferential dimension of the first and of the second circumferential sector therefore typically depends on the angle of opening of each of the half-parts of the rear internal structure 15.

Naturally, the half-part of the rear internal structure 15, not shown on FIG. 21, is symmetrical with the one that is shown thereon.

In this example, the panel or panels 21 cooperate with the beams 20 and/or with the frame 9 and/or with the rear internal structure 15 in accordance with the same principles as those described above with reference to the embodiments in FIGS. 3 to 20.

FIG. 22 presents a variant that is distinguished from the embodiment in FIG. 21 in that the front internal structure 14 comprises a panel 21 articulated on the rear internal structure 15 so that, when the latter is placed in maintenance configuration, this panel 21 can be folded radially inwards according to the configuration illustrated on FIG. 22 so as to avoid the collision or interference of this panel 21 with the external casing 3.

The dimension of the panel 21 connected to the rear internal structure 15 can cover only a portion of said second circumferential sector, another portion of this second circumferential sector being able to be covered by one or more other panels 21 cooperating with beams 20 and/or with the frame 9 and/or with the rear internal structure 15 according to the same principles as those described above with reference to the embodiments in FIGS. 3 to 21.

The above description is in no way limitative and the principles of the invention can be implemented and combined in many ways without departing from the scope of the invention. For example, the propulsion assembly 10 may not have a thrust reverser and comprise a fixed external structure 12. Alternatively, the propulsion assembly 10 may comprise a thrust reverser with flaps the linkages of which cooperate not with the front internal structure 14 but with the rear internal structure 15, for example in the context of a D-shaped nacelle architecture.

The invention claimed is:

1. A nacelle for an aircraft bypass propulsion assembly, said nacelle comprising:
    an external structure and a rear internal structure extending around a longitudinal central axis, the rear internal structure being able to move between:
        a flight position wherein the rear internal structure delimits radially inwards a first longitudinal portion of an annular channel intended to channel the secondary flow in the propulsion assembly and wherein the rear internal structure covers a first longitudinal portion of an internal space intended to receive an engine of the propulsion assembly, and
        a maintenance position wherein the rear internal structure is configured for uncovering at least a part of said first longitudinal portion of the internal space in order to enable an operator to access said internal space,
    wherein said nacelle comprises a front internal structure comprising beams and one or more panels, the beams extending longitudinally and being spaced apart from each other circumferentially with respect to the longitudinal central axis, the one or more panels being able to be placed in:
        a closed configuration wherein the one or more panels cooperate with the beams so as to delimit radially inwards a second longitudinal portion of the annular channel and so as to cover a respective circumferential portion of a second longitudinal portion of said internal space,
        a maintenance configuration wherein the one or more panels leave clear a circumferential space between the beams in order to enable an operator to access said second longitudinal portion of the internal space.

2. The nacelle according to claim 1, wherein the front internal structure comprises a rear end configured for cooperating with a front end of the rear internal structure when the front internal structure is in the closed configuration and the rear internal structure is in the flight position.

3. The nacelle according to claim 2, wherein said rear end of the front internal structure is formed by one or more of said beams.

4. The nacelle according to claim 2, wherein the rear end of the front internal structure cooperates with the front end of the rear internal structure so as to transmit axial forces from the rear internal structure to the front internal structure.

5. The nacelle according to claim 1, wherein the beams of the front internal structure are configured for being connected to a frame of the engine.

6. The nacelle according to claim 5, comprising support linkages, each support linkage being connected at a first end to an intermediate part or a rear part of a respective one of the beams and being configured for being connected at a second end to said frame of the engine.

7. The nacelle according to claim 1, wherein at least one of said one or more panels is connected to one or more of said beams or configured for being connected to a frame of the engine in a pivot connection allowing movement thereof between the closed configuration and the maintenance configuration.

8. The nacelle according to claim 1, wherein at least one of said one or more panels is connected to the rear internal structure in a pivot connection, the rear internal structure comprising a front part provided with a cutout so that, when the rear internal structure is in the flight position and the one or more panels are in the closed position, said front part of the rear internal structure forms a first circumferential sector and said at least one or more panels connected to the rear internal structure forms a second circumferential sector, the first and the second circumferential sector each delimiting radially inwards a respective sector of said second longitudinal portion of the annular channel.

9. The nacelle according to claim 1, comprising a thrust reverser having flaps, the external structure being able to move between an advanced position and a retracted position, the nacelle comprising linkages connected at a first end to a respective one of the beams of the front internal structure and at a second end to a respective one of the flaps so that, when the external structure is moved from the advanced position to the retracted position, the flaps deploy in the annular channel.

10. An aircraft bypass propulsion assembly, said propulsion assembly comprising:
    an engine; and
    a nacelle according to claim 1,
    the engine comprising a hub, an external casing and one or more radial arms connecting the hub and the external casing to each other, the external casing extending longitudinally at the rear with respect to a front part of the front internal structure so that said annular channel is, over a part of said second longitudinal portion, delimited radially inwards by the one or more panels of the front internal structure and radially outwards by the external casing.

11. The nacelle according to claim 1, wherein the beams are cantilevered at front ends thereof.

* * * * *